March 22, 1949.  F. P. RUST  2,464,829
ELEVATED TANK
Filed March 19, 1947  4 Sheets-Sheet 1
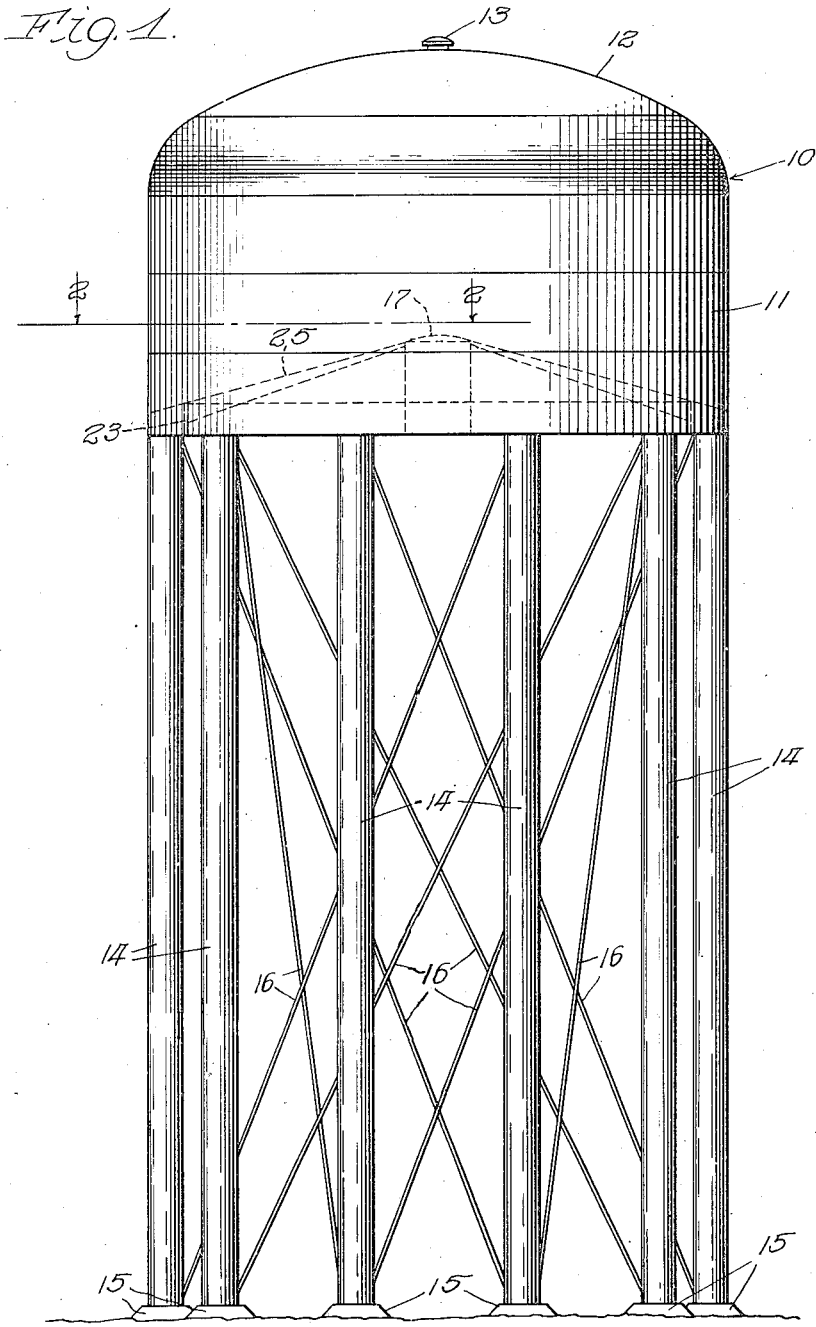

March 22, 1949.　　　　　F. P. RUST　　　　　2,464,829
ELEVATED TANK
Filed March 19, 1947　　　　　　　　　　　　4 Sheets-Sheet 2
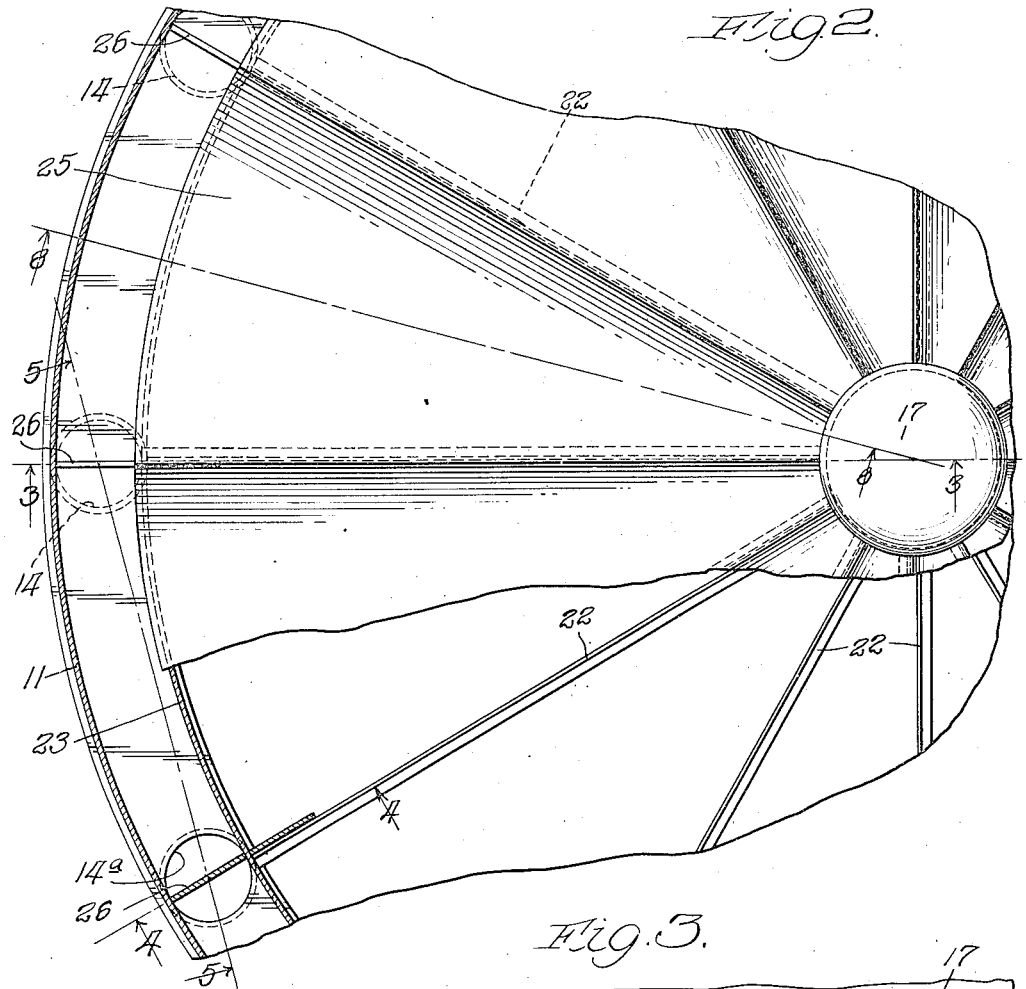
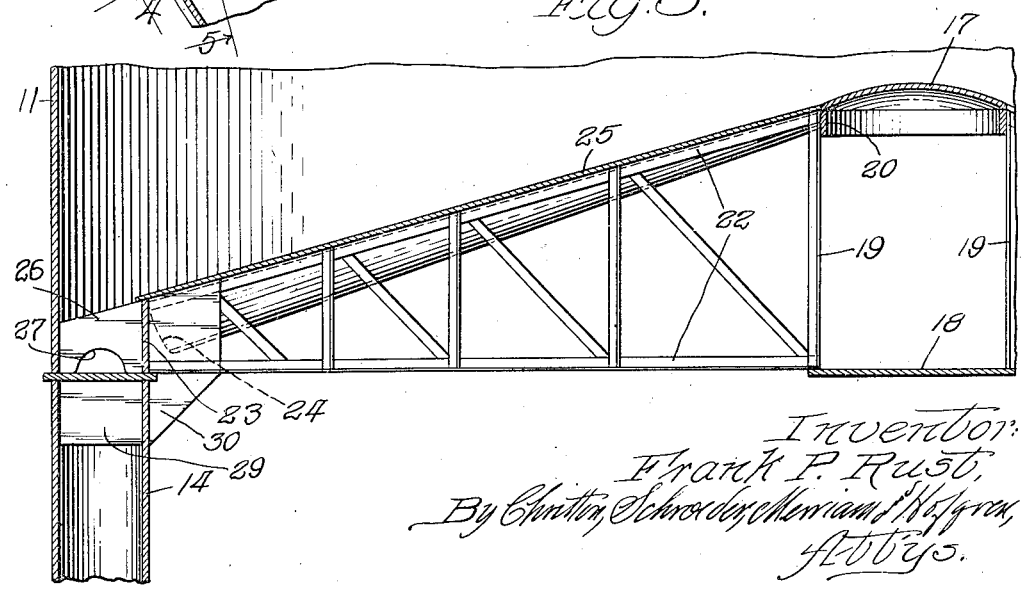
Inventor:
Frank P. Rust,
By Chritton, Schroeder, Merriam & Holgren,
Attys.

March 22, 1949.　　　F. P. RUST　　　2,464,829
ELEVATED TANK

Filed March 19, 1947　　　　　　　　4 Sheets-Sheet 3

Inventor:
Frank P. Rust,
By Chritton, Schroeder, Merriam & Hofgren,
Attys.

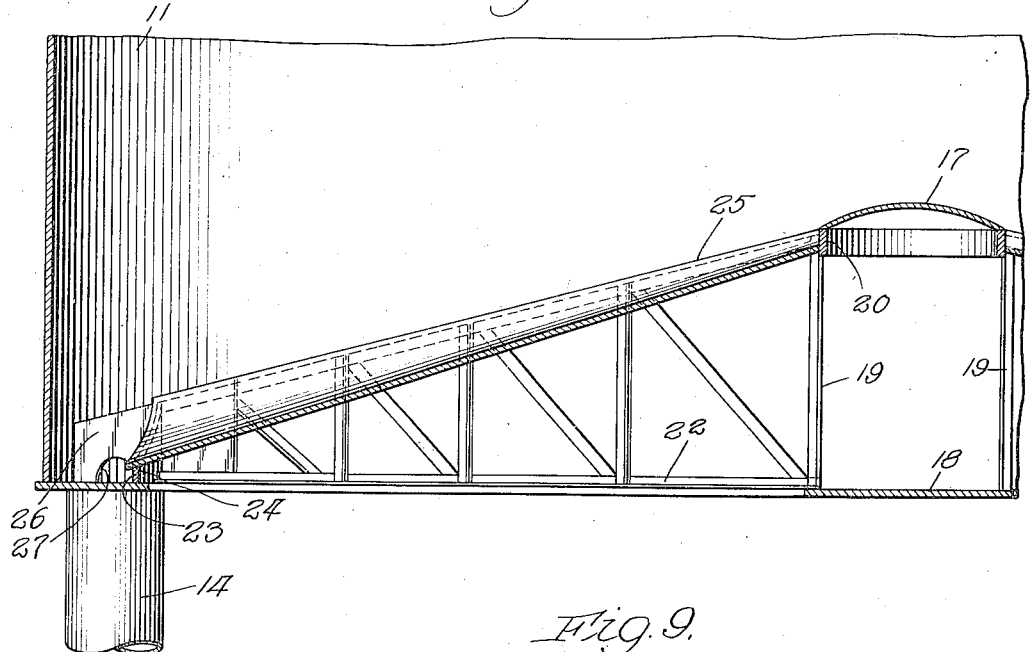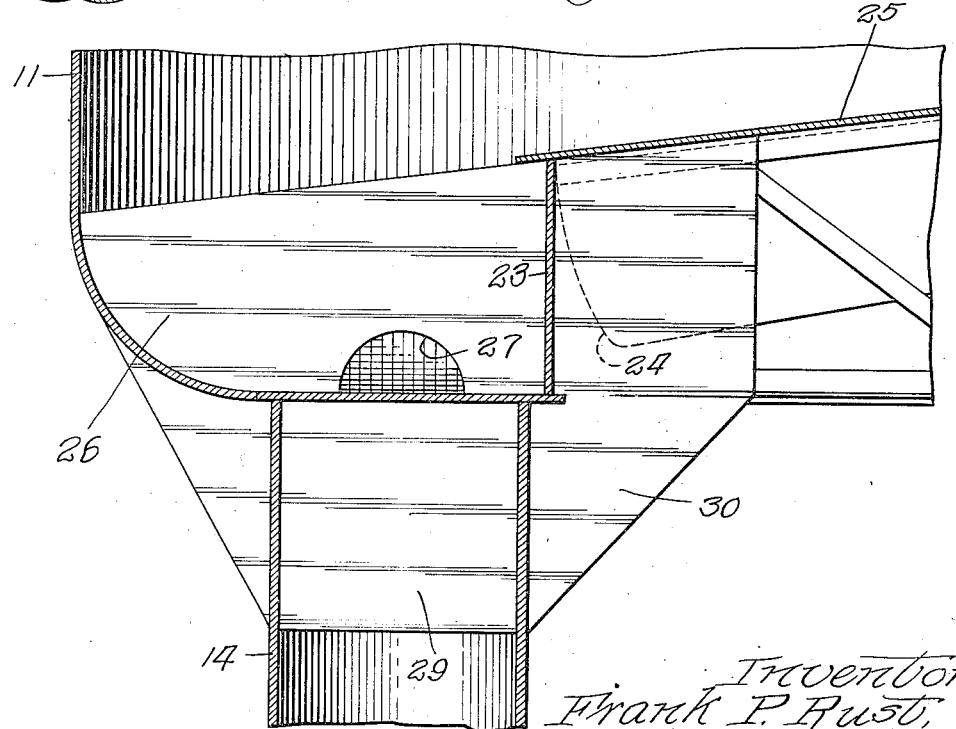

Patented Mar. 22, 1949

2,464,829

UNITED STATES PATENT OFFICE 2,464,829

ELEVATED TANK

Frank P. Rust, Chicago, Ill., assignor to Chicago Bridge & Iron Company, a corporation of Illinois Application March 19, 1947, Serial No. 735,650

13 Claims. (Cl. 220—1)

This invention relates to liquid storage tanks, and more particularly to an elevated water tank.

It is an object of this invention to produce an elevated liquid storage tank of new and improved design and construction.

The invention will be described in conjunction with the embodiments shown in the accompanying drawings in which:

Fig. 1 is a side elevation of a liquid storage tank embodying one form of the invention;

Fig. 2 is a horizontal section taken along line 2—2 of Fig. 1;

Fig. 3 is a vertical section through a portion of the bottom of the tank along line 3—3 of Fig. 2;

Fig. 8 is a vertical section along lines 8—8 of Fig. 2; and

Fig. 9 is a vertical section along a modified form of construction.

Figure 4:
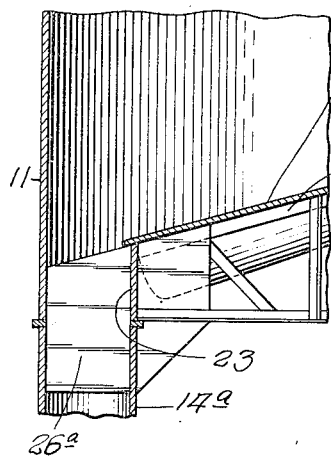
Fig. 4 is a vertical section along line 4—4 of Fig. 2 showing the riser pipe.
Figure 5:
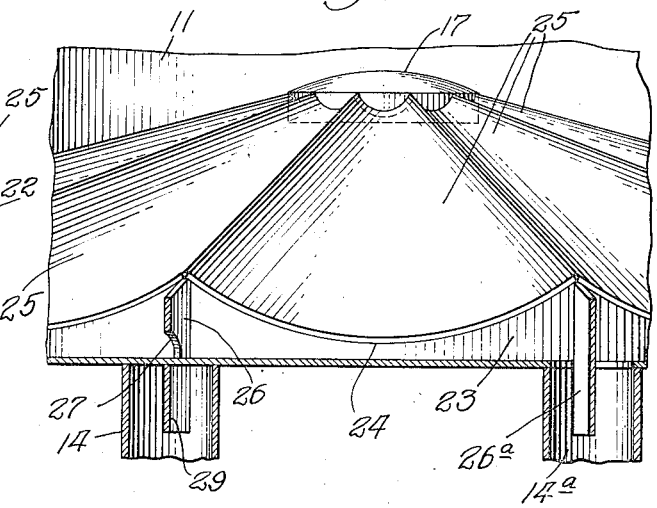
Fig. 5 is a vertical section along line 5—5 of Fig. 2 showing further details of the construction.

Referring now to the drawings, 10 indicates an elevated storage tank having substantially cylindrical sides 11 and a top 12, the top being provided with a manhole 13. A plurality of supporting posts 14 extend about the periphery of the tank to support it above the ground, the bottom of the posts being set on concrete piers 15. Various column rods 16 brace the supporting columns.

As best shown in Figs. 2 to 5 inclusive and Fig. 8, the bottom of the tank consists of a central upwardly dished head plate 17 supported above the bottom girder 18 of the tank by bracing members 19. Attached to the head plate is an inner ring plate 20. A plurality of trusses 22 radiate from the head plate and terminate at an outer ring plate 23. The outer ring plate is provided with a plurality of scalloped portions 24 about its periphery. Extending between and welded to the trusses 22 are a plurality of conical sections 25 of sheet metal radially arranged about the head plate, the conical sections being welded at their inner and outer edges to the inner and outer ring plates. The conical sections are arrayed with their convex sides toward the base, that is to say, are convex downwardly. The conical sections extend downwardly from their point of attachment to the inner ring plate to the point of attachment to the outer ring plate, as shown. The outer ring plate 23 has a diameter less than the diameter of the tank, and hence provides an annular drain trough adjacent the sides of the tank. A plurality of solid vertical plates 26 extend between the ends of the trusses 22 and the inner side of the tank 11. The supporting posts 14 provided about the tank are equal in number to the number of radial trusses 22, and are positioned adjacent the ends of those trusses. The vertical plates 26, by being connected to the outer ring plate opposite the points of connection of the radial trusses, bisect the projected ends of the supporting posts including the post 14a, which in the embodiment shown in the drawings, comprises the riser pipe. All of the vertical plates excepting the plate 26a over the riser, are provided with a drain opening 27 to provide communication between the various sections of the annular drain trough defined thereby, and the riser pipe 14a.

Inside the top of each column is a radial diaphragm 29 positioned directly beneath the vertical plates 26. The connection of the columns to the tank is strengthened by a triangular bracket plate 30 welded to the upper inner portion of the column and to the radial trusses 22.

Figure 6:
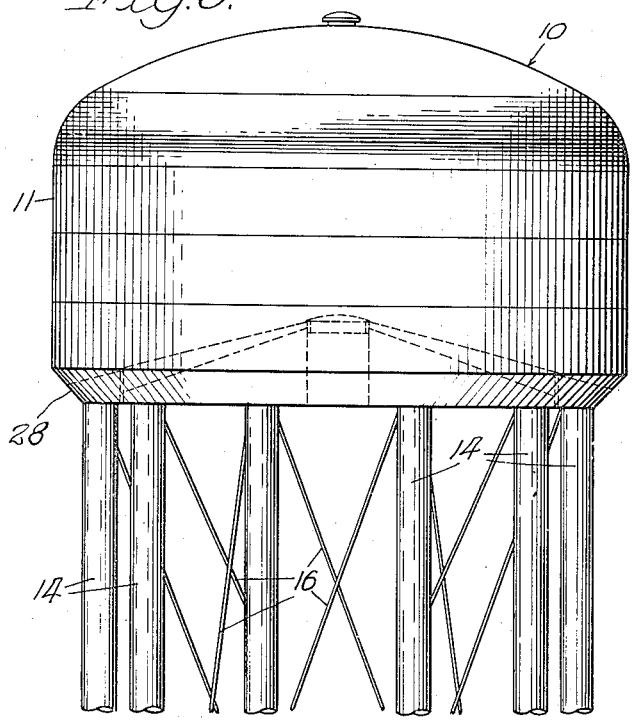
Fig. 6 is a side elevation of a different embodiment of the tank shown in Fig. 1.
Figure 7:
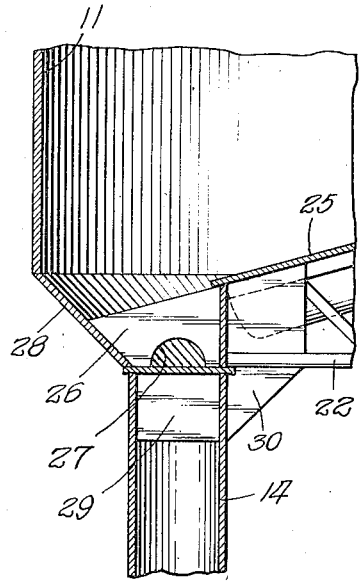
Fig. 7 is a vertical section taken at the side of the tank shown in Fig. 6 and showing details of the construction.

The embodiment shown in Figs. 6 and 7 is, in all respects but one, similar to that shown in the previous figures, the difference being that the lower portion of the side 11 is in the form of an inverted truncated cone 28. This latter construction reduces the diameter of the truss span, as the columns are attached to the tank somewhat inwardly of the outer edge thereof.

The embodiment shown in Fig. 9 is likewise similarly constructed except that the lower portion of the side is in toroidal form. This form also has the advantage of a reduced truss span.

A storage tank which I have just described, has many important advantages. Drainage is exceptionally good. Not only does the bottom of the tank slope outwardly and downwardly from the center to the annular drain trough, but the conical sections of the bottom increase the drainage effect. Furthermore, by utilizing one of the supporting columns as a riser, the central column is eliminated. The riser pipe is often made of larger diameter than the supporting columns to provide insulation against cold and thereby to prevent freezing of the water in the riser. The column 14a, which acts as a riser, may be made larger for the same reason, if desired.

With a large central riser in the usual form of storage tank, a larger concrete foundation must be provided for that pipe. This necessitates making the foundations or piers under the circumferential supporting columns equally as deep to prevent their being undermined by the foundation under the central riser. No such difficulties are encountered with the construction shown herein, and the depth of the foundation may be constant and relative shallow, sufficient only to support the tank.

The bottom of the tank is easily accessible for painting or other repairs, and no balcony is required about the tank since access may be had to the inside of the tank by running the ladder directly up the column and shell to the manhole on top. Furthermore, the use of the inner ring plate and the outer scalloped ring plate in conjunction with the conical sections facilitates ease of assembly in the field.

The construction shown also provides for a post circle of larger diameter than with ordinary elevated storage tanks of the same capacity and therefore results in smaller post stresses induced by wind and permits smaller rods to be employed.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. An elevated liquid storage tank having substantially cylindrical sides, a top, and a bottom comprising an outer scalloped ring plate having a diameter less than the diameter of the tank, a central head plate, a plurality of radial trusses attached to said plates, and a plurality of downwardly convex conical sections radially arranged about the head plate and attached to said plates and to said trusses.

2. The elevated tank of claim 1 including a drain trough between said scalloped plate and the sides of the tank.

3. The elevated tank of claim 1 including an inner ring plate attached to said head plate and to the inner edges of said conical sections.

4. The elevated tank of claim 1 including a plurality of supporting posts about the outer periphery of the tank, at least one of said posts being connected to said drain trough to act as a riser.

5. The elevated tank of claim 1 including a plurality of circumferential supporting posts, at least one of said posts being connected to said drain trough to act as a riser, and a foundation for said posts, said foundation having a relatively shallow depth sufficient only to support said tank.

6. The elevated tank of claim 1 in which the lower portion of the sides of said tank are in the form of an inverted truncated cone.

7. The elevated tank of claim 1 in which the lower portion of the sides of said tank are in the form of a toroidal section.

8. The elevated tank of claim 1 including a plurality of vertical plates in the drain trough and attached to the outer scalloped plate and to the sides of the tank, said vertical plates being provided with a drain opening.

9. An elevated liquid storage tank having substantially cylindrical sides, a top, and a bottom comprising an outer scalloped ring plate having a diameter less than the diameter of the tank, a central head plate, an inner ring plate attached to said head plate, a plurality of radial trusses attached to said ring plates, a plurality of downwardly convex conical sections radially arranged about the head plate and attached to said ring plates and to said trusses, an annular drain trough between said outer scalloped plate and the sides of the tank and a plurality of vertical plates in the drain trough attached to the outer scalloped plate opposite the point of attachment of said trusses, and attached to the sides of the tank, said vertical plates being provided with a drain opening.

10. The elevated tank of claim 9 including a plurality of supporting posts about the outer periphery of the tank, at least one of said posts being connected with said drain trough to act as a riser.

11. An elevated liquid storage tank having substantially cylindrical sides, a top, and a bottom comprising a central head plate, a plurality of trough sections radially arranged about the head plate and extending downwardly therefrom towards the side of the tank, an annular drain trough between the outer end of the trough sections and the sides of the tank, and a plurality of supporting posts about the outer periphery of the tank, at least one of said posts being connected with said drain trough to act as a riser.

12. The liquid storage tank of claim 11 including a plurality of trusses radiating from the central head plate and extending outwardly along the edges of the trough sections, and a plurality of vertical plates between the ends of the trusses and the side walls, said vertical plates being positioned over each of said supporting posts.

13. The liquid storage tank of claim 11 including a foundation for said posts, said foundation having a relatively shallow depth sufficient only to support said tank.

FRANK P. RUST.

REFERENCES CITED

The following references are of record in the file of this patent:

UNITED STATES PATENTS

| Number | Name | Date |
|---|---|---|
| 2,358,805 | Horton | Sept. 26, 1944 |